United States Patent
Strahan

(10) Patent No.: US 7,252,700 B1
(45) Date of Patent: *Aug. 7, 2007

(54) MOBILE GAS SEPARATOR SYSTEM AND METHOD FOR TREATING DIRTY GAS AT THE WELL SITE OF A STIMULATED GAS WELL

(76) Inventor: Ronald L. Strahan, 14001 Plymouth Crossing, Edmond, OK (US) 73034

( * ) Notice: Subject to any disclaimer, the term of this patent is extended or adjusted under 35 U.S.C. 154(b) by 0 days.

This patent is subject to a terminal disclaimer.

(21) Appl. No.: 11/161,770

(22) Filed: Aug. 16, 2005

Related U.S. Application Data

(63) Continuation of application No. 10/695,610, filed on Oct. 28, 2003, now Pat. No. 6,955,704.

(51) Int. Cl.
*B01D 46/46* (2006.01)
*B01D 53/22* (2006.01)
*B01D 53/02* (2006.01)
*E21B 43/00* (2006.01)

(52) U.S. Cl. .................. 95/8; 95/1; 95/11; 95/14; 95/18; 95/45; 95/52; 95/141; 95/143; 95/273; 95/287; 96/4; 96/7; 96/108; 96/420; 55/356; 55/385.1; 55/482; 166/267

(58) Field of Classification Search ............... 95/1, 95/8, 11, 14, 18, 19, 43, 45, 52, 49, 50, 51, 95/90, 141, 143, 273, 286, 287; 96/4, 7, 96/108, 420; 55/356, 482, DIG. 17, 385.1; 166/267; 422/168, 169
See application file for complete search history.

(56) References Cited

U.S. PATENT DOCUMENTS 3,719,028 A    3/1973   Brooks (Continued)

FOREIGN PATENT DOCUMENTS

EP    0 130 066 A2    1/1985

(Continued)

OTHER PUBLICATIONS

Excerpt from "Field Evaluation of a Membrane-Based Separation System for Removing CO2 from Natural Gas", Gas Research Institute, published in the United States, Jul. 1993, 2 pages.*

(Continued)

*Primary Examiner*—Jason M. Greene
(74) *Attorney, Agent, or Firm*—Mary M. Lee

(57) ABSTRACT

A method and mobile system for cleaning dirty gas from a newly stimulated gas well. The entire system is supported on a trailer or other mobile support so that it can be driven from well site to well site for short-term, post-stimulation use only. The system comprises a gas separator, such as a membrane separator. The system also includes a pretreatment assembly for preparing the gas for the gas separator. The pretreatment assembly may include separators, a heater, a guard vessel and a polishing filter. A chiller or heat exchanger cools the treated gas to a marketable temperature. A generator and a hydraulics plant provide power to the system. Each mobile system will be designed to treat gases with widely different operating conditions varying from well to well.

35 Claims, 2 Drawing Sheets

U.S. PATENT DOCUMENTS

| | | | |
|---|---|---|---|
| 3,811,319 | A | 5/1974 | Arnold |
| 4,040,265 | A | 8/1977 | Hellerman et al. |
| 4,130,403 | A | 12/1978 | Cooley et al. |
| 4,597,437 | A | 7/1986 | McNabb |
| 4,617,030 | A | 10/1986 | Heath |
| 4,763,487 | A | 8/1988 | Wicks |
| 4,779,677 | A | 10/1988 | Cobb |
| 4,836,243 | A | 6/1989 | Ferrell |
| 4,881,953 | A | 11/1989 | Prasad et al. |
| 4,995,460 | A | 2/1991 | Strahan |
| 5,082,556 | A | 1/1992 | Reese |
| 5,096,468 | A | 3/1992 | Minhas |
| 5,221,302 | A | 6/1993 | Sheehan |
| 5,313,061 | A | 5/1994 | Drew et al. |
| 5,335,728 | A | 8/1994 | Strahan |
| 5,401,300 | A | 3/1995 | Lokhandwala et al. |
| 5,407,466 | A | 4/1995 | Lokhandwala et al. |
| 5,407,467 | A | 4/1995 | Lokhandwala et al. |
| 5,556,449 | A | 9/1996 | Baker et al. |
| 5,669,959 | A | 9/1997 | Doshi et al. |
| 5,922,178 | A | 7/1999 | Isenberg |
| 5,964,923 | A | 10/1999 | Lokhandwala |
| 6,085,528 | A | 7/2000 | Woodall et al. |
| 6,085,549 | A | 7/2000 | Daus et al. |
| 6,128,919 | A | 10/2000 | Daus et al. |
| 6,221,131 | B1 | 4/2001 | Behling et al. |
| 6,267,931 | B1 | 7/2001 | Nickens et al. |
| 6,503,295 | B1 | 1/2003 | Koros et al. |
| 6,630,011 | B1 | 10/2003 | Baker et al. |
| 6,632,266 | B2 | 10/2003 | Thomas et al. |
| 6,955,704 | B1 * | 10/2005 | Strahan ............................ 95/8 |
| 2002/0195250 | A1 | 12/2002 | Underdown et al. |
| 2003/0225169 | A1 | 12/2003 | Yetman |
| 2004/0099138 | A1 | 5/2004 | Karode et al. |

FOREIGN PATENT DOCUMENTS

| | | |
|---|---|---|
| WO | WO 95/11737 | 5/1995 |
| WO | WO 00/32512 | 6/2000 |
| WO | WO 03/022408 A1 | 3/2003 |

OTHER PUBLICATIONS

"Small Scale LNG Unit, Large Scale Potential," Australian Energy News, Issue 22, Dec. 2001, published in Australia and on the Internet (4 pages).

Excerpt from "The Cost of Conditioning Your Natural Gas for Market," Gas Research Institute, published prior to the filing date of the present application, published in the United States and on the Internet at least as early as Jun. 8, 2001 at http://www.gri.org/pub/oldcontent/tech/e+p/gproc/kellogg//t32/t32.html. (5 pages).

Excerpt from "Field Evaluation of a Membrane-Based Separation System for Removing CO2 from Natural Gas," Gas Research Institute, published in the United States, Jul. 1993. (2 pages).

"Field Evaluation Supports Applicability of Membrane Processing," Gas Research Institute, published on the Internet prior to the filing date of the present application at http://www.gri.org/pub/oldcontent/tech/e+p/gastips/spring96/fieldeval.htm. (10 pages).

Excerpts from The Wittman Company, LLC website at http://www.wittmann.com entitled "Liquid CO2 Stripping Systems," taken from pages http://www.wittemann.com/stripping.htm, http://www.wittemann.com/stripping-flow.htm, and http://www.wittemann.com/old_site/app.htm, published on the Internet at least as early as Mar. 22, 2001. (4 pages).

"The Great Cleanup: New Technologies for Tidying up Dirty Gas," published on the Internet at least as early as Mar. 21, 2001 on the Gas Research Institute website at http://www.gri.org/pub/content/feb/19980219/18464/great_cleanup.html. (4 pages).

U.S. Dept. Of Energy, EIA Reports, "Higher Energy Prices, Cuts in Fuel Use May Be Needed to Comply with the Kyoto Protocol," published on the Internet prior to the filing date of the present application at http://www.eia.doe.gov/neic/press/press109.html. (4 pages).

Dennis Denney, "Pipeline-Quality Natural Gas After Molecular-Gate CO2 Removal," published in the U.S. Sep. 2003, pp. 77-78 of the 2003 SPE/EPA/DOE Exploration and Production Enviornmental Conference. San Antonio, TX (2 pages).

"GTI Reports Significant Results from Advanced Membrane in Cooperative Tests of Direct Methanol Fuel Cell," published prior to the filing date of the present application on Gas Research Institute website at http://www.gastechnology.org/webroot/app/xn/xd.aspx?it=enweb&xd=6newsroom/gtireports significant results advancedmembranecooperativetestsdirectmethanolfuelcell.xml (2 pages).

"Halting the Flaring: Zeus Conference to Address Issues for Advancing Market-Based Alternative for Associated Gas," published by Zeus Development Corporation in the United States prior to the filing date the present application. (2 pages).

* cited by examiner

MOBILE GAS SEPARATOR SYSTEM AND METHOD FOR TREATING DIRTY GAS AT THE WELL SITE OF A STIMULATED GAS WELL

This application is a continuation of application Ser. No. 10/695,610, entitled "Mobile Gas Separator System and Method for Treating Dirty Gas at the Well Site of a Stimulated Gas Well," filed Oct. 28, 2003, now U.S. Pat. No. 6,955,704 B1, issued Oct. 18, 2005 and the contents of that application are incorporated herein by reference.

FIELD OF THE INVENTION

The present invention relates to methods and devices for cleaning "dirty" gas from a recently stimulated gas well.

BACKGROUND OF THE INVENTION

When a gas well is stimulated, the initial raw gas emitted at the wellhead is a mixture of natural gas, other hydrocarbons and contaminates, such as hydrogen sulfide ($H_2S$), water ($H_2O$) and carbon dioxide ($CO_2$). This so-called "dirty" gas may also contain particulate matter, such as sand and particles of drilling fluids.

Each pipeline company has its own set of natural gas quality specifications that delivered gas must meet. For example, pipelines typically limit $CO_2$ content due to its corrosive properties. A common maximum for $CO_2$ content in delivered is gas is one to three percent (1-3%) by volume, while raw gas from a recently stimulated well may exceed 30 percent. Similarly, hydrogen sulfide is corrosive and is hazardous to humans if inhaled, so it is also subject to restrictions (typically $\leq 4$ ppm) by pipeline companies. In addition, delivered gas specifications typically limit water vapor content.

Because of these common contaminants, raw gas produced immediately after stimulation rarely meets typical delivered gas specifications. However, in most wells, the gas stream will soon become pipeline quality if the well is flared or vented for a brief period. For example, most gas wells begin producing marketable gas after 3-5 days of flaring. The dirty gas usually is vented to the atmosphere until sensors show reduced and acceptable levels of contaminants.

Flaring has a detrimental effect on the environment because it releases the contaminants into the air. In addition, flaring wastes a significant amount of natural gas and other hydrocarbons. For example, when raw gas containing five percent (5%) contaminants is flared, ninety-five percent (95%) of the flared product is good natural gas that is wasted. Treatment and sale of the dirty gas would significantly increase profits to operators, tax revenues to the states, and payments to the royalty owners.

Permanent and semi-permanent treatment systems have been used at well sites where the deep gas is not pipeline quality and permanent treatment of the produced gas is required. Alternately, produced gas from such wells has been shipped to processing facilities remote from the well. Neither of these options is economically feasible for cleaning the gas produced after a stimulation procedure in a well where only the initial post-stimulation gas is unmarketable.

The present invention provides a mobile gas separation system suitable for temporary use at the well site of a recently stimulated gas well. The system is adequate to serve wells with a range of different requirements. The method of this invention permits the sequential use of the gas separation system for short periods of time at a number of wells, each having different capacities and requirements. Accordingly, the method and system of this invention provide a temporary, on-site cleaning of dirty gas, preserving this valuable natural resource, protecting the environment, and maximizing revenues to the state, the operators and the royalty owners.

DETAILED DESCRIPTION OF THE PREFERRED EMBODIMENT

Figure 1:
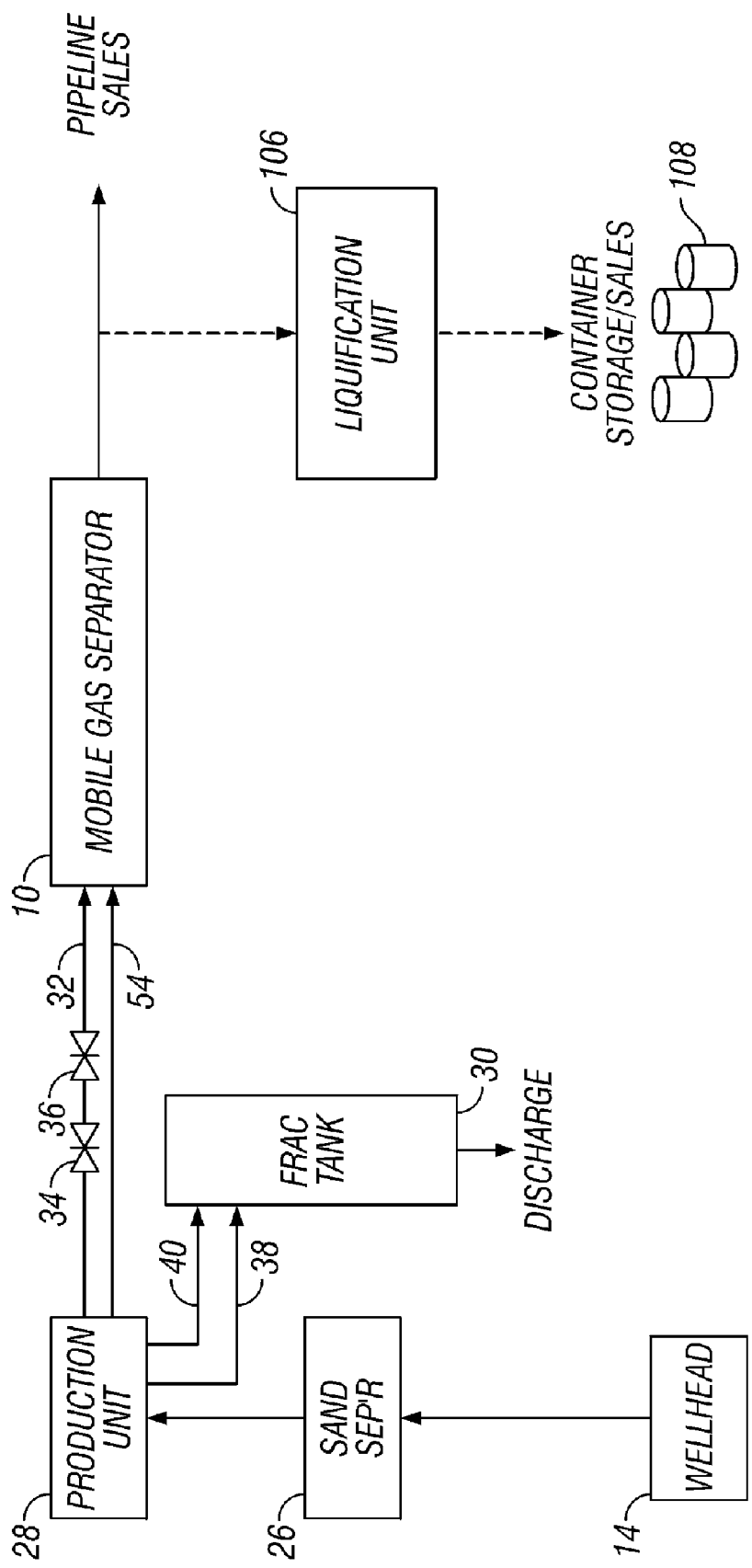
FIG. 1 is a schematic illustration of the method and system of the present invention constructed in accordance with one preferred embodiment of the present invention.

With reference now to the drawings in general and to FIG. 1 in particular, there is shown therein a mobile gas separator system constructed in accordance with one preferred embodiment of the present invention and designated generally by the reference numeral 10. The system is designed for temporary, short-term use at a gas well immediately after stimulation, when the initial raw gas is dirty or heavily contaminated. In particular, the system 10 is designed to be moved from well to well. In this way, a small mobile system is available to operators to treat and sell the initial post-stimulation gas instead of flaring or venting it to the atmosphere.

As used herein, "immediately after stimulation" and similar expressions refer to the period following completion of a stimulation procedure during which the well is producing gas that is not marketable. As used herein, "marketable gas" refers to natural gas that meets pipeline company delivered gas standards.

Figure 2:
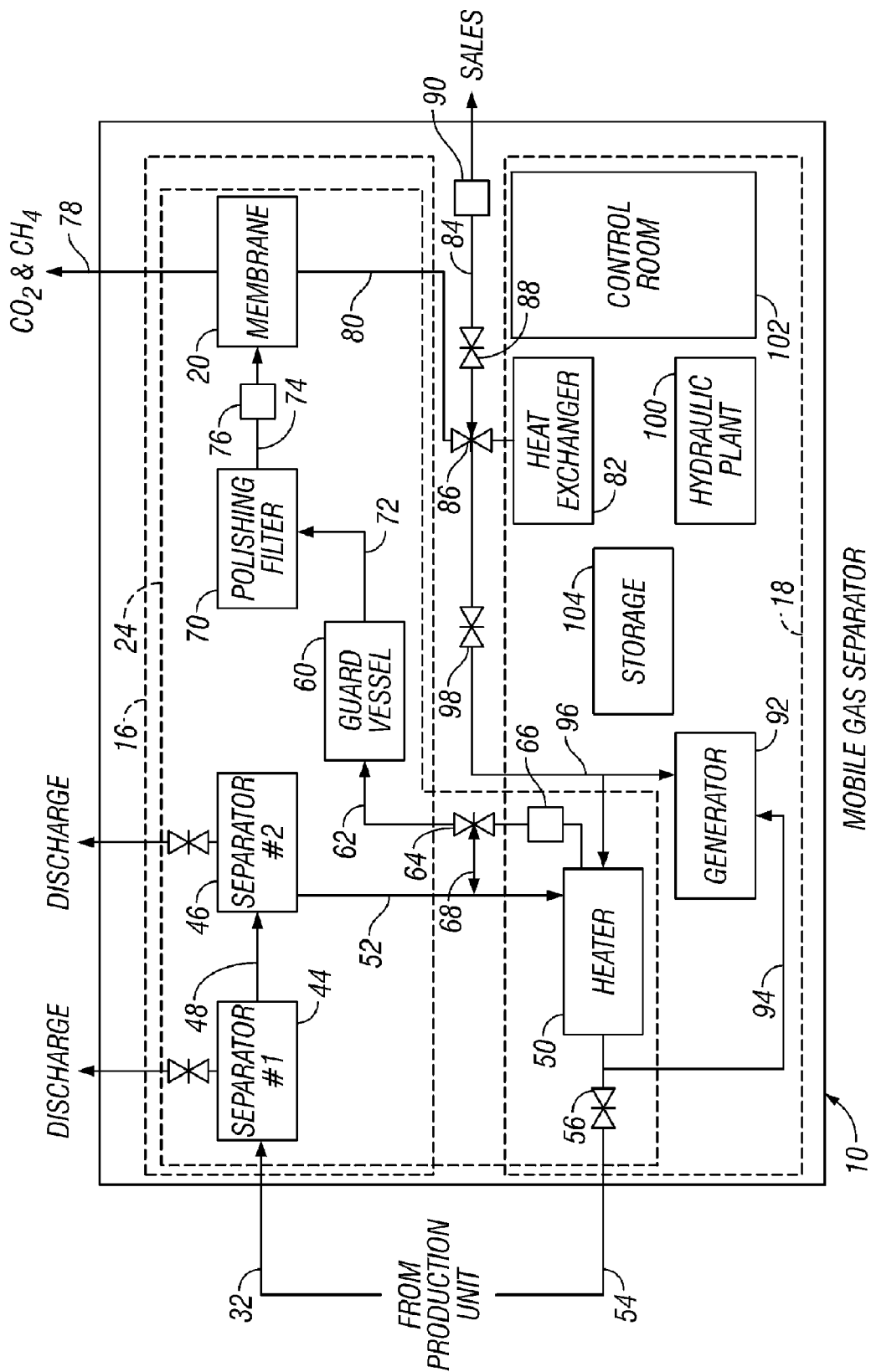
FIG. 2 is a detailed schematic illustration of a preferred mobile gas separator system of the present invention.

Turning now to FIG. 2, the system 10 comprises a mobile support adapted to be moved from well site to well site and to be parked temporarily at each site preferably near the well head 14 (FIG. 1). As used herein, "at the well site" means in the general vicinity of the well head or in a nearby location associated with the well. In the case of adjacent wells, "at the well site" may include a single location near to all the adjacent wells.

This mobile support preferably takes the form of one or more trailers 16 and 18 that can be removably connected to trucks or other vehicles (not shown). In this way, the system 10 can be transported easily from well to well. In one preferred embodiment, the entire system is supported on two equally-sized trailers 16 and 18 that can be parked side by side adjacent the wellhead 14.

A gas separator is mounted on the mobile support. The gas separator is adapted to remove selected contaminants from the dirty gas to produce marketable gas. The contaminants to be removed may vary depending on the characteristics of the gas produced. Accordingly, the type of gas separator may vary as well. As explained herein, typical major contaminants of raw gas produced immediately after stimulation include carbon dioxide, hydrogen sulfide and water. Accordingly, an ideal gas separator for this application is a membrane separator 20. More preferably, the membrane separator 20 is adapted to selectively reduce the content of carbon dioxide, hydrogen sulfide and water in the gas being treated. Most preferably, the membrane separator 20 comprises cellulose acetate polymer membrane modules. Suitable membrane separators are available from Natco Group, Inc.

(Houston, Tex.), UOP L.L.C. (Des Plaines, Ill.), and Kvaerner Process Systems US, Inc. (Houston, Tex.).

Optimal function and durability of the preferred membrane separator 20 depends on the condition of the raw gas introduced into the separator. For example, permeation characteristics of the cellulose acetate membranes can be adversely affected by liquid water, glycol, amine, lubricating oil, and other heavy hydrocarbon liquids in the gas. In addition, permeability of a given molecule is affected by feed gas pressure, feed gas temperature and concentration of the molecule in the feed gas. Thus, the dirty gas should be heated and pressurized to a prescribed range. For these purposes, the system 10 preferably will include a pretreatment assembly 24 mounted on the trailers 16 and 18.

The pretreatment assembly 24 is adapted to receive the dirty gas from the wellhead 14 of gas well (not shown). Usually, the operator will provide a sand separator 26, a production unit 28 and a frac tank 30 at the well site, and the system will simply receive dirty gas from the production unit in a known manner through a conduit 32. The conduit 32 to the pretreatment assembly 24 typically will be equipped with an isolation (ball) valve 34 and a throttle valve 36. This throttle valve 36 allows the dirty gas feed to the system 10 to be maintained at a constant flow and pressure. The isolation valve 34 is a shutdown and safeguard. Conduits 38 and 40 are provided to the frac tank 30 for oil and water, respectively.

The pretreatment assembly 24 is adapted to prepare the dirty gas for the membrane separator 20. To that end, the pretreatment assembly 24 preferably includes a first separator 44 adapted to remove selected contaminants from the dirty gas. More preferably, the first separator 44 is a sand separator adapted to remove sand and other particulate matter from the dirty gas passing through it.

The pretreatment assembly 24 preferably includes a second separator 46 connected to the first separator 44 by a conduit 48. The second separator 46 is adapted to remove small oil and water aerosols from the dirty gas. Most preferably, the second separator 46 is a two-chamber coalescing filter separator designed to agglomerate and capture about ninety-nine percent (99%) of small oil and water aerosols greater than 0.3 microns. This filter may be equipped with two independent level controls, two level gauges, and two automatic liquid level control valves.

The pretreatment assembly 24 preferably also includes a heater, such as a water bath heater 50, adapted to adjust the temperature of the dirty gas to a temperature suitable for the membrane separator 20. In most instances, this temperature range will be from about 125 degrees to 120 degrees Fahrenheit. A conduit 52 connects the separator 46 to the heater 50. A conduit 54 connects the production unit 28 to circulate dirty pretreatment gas to fuel the heater 50. An isolation valve 56 may be included in this conduit. Thus, the heater 50 initially can be fueled by the dirty gas until sweetened gas from the system 10 is available, as explained hereafter.

The pretreatment assembly 24 preferably also includes a guard vessel 60 adapted to remove oil and glycol vapors from the dirty gas. Preferably, the guard vessel comprises an activated carbon adsorbent. The guard vessel 60 receives warm dirty gas from the heater 50 through the conduit 62. The conduit 62 and other conduits downstream of the heater 50 should be insulated to minimize heat loss.

To ensure that the gas entering the guard vessel 60 is warmed to the desired temperature, the system 10 may be provided with a recirculating assembly. The recirculating assembly preferably takes the form of a recirculating valve 64 and temperature sensor 66 connected in series in the conduit 62 between the heater and guard vessel 60. The fluid leaving the heater through the conduit 62 will be diverted through the three-way valve 64 to the conduit 52 through a crossover conduit 68 until the sensor 66 senses that the fluid has acquired the desired temperature. When the gas leaving the heater 50 has reached the desired temperature, it will redirected to the guard vessel 60.

Still further, the preferred pretreatment assembly 24 includes a polishing filter 70 connected to the guard vessel 60 by a conduit 72. The polishing filter 70 is designed to remove additional aerosols and fine particulate matter from the dirty gas. Pre-treated gas from the polishing filter is fed to the membrane separator 20 through the conduit 74. A gas analyzer 76, preferably providing a BTU reading, may be included in the conduit 74 to verify the condition of the pretreated dirty gas before it enters the membrane separator 20.

Conduits, indicated collectively at 78, allow carbon dioxide and methane removed from the gas by the membrane separator 20 to be flared to the atmosphere, vented to the frac tank 30 by a conduit (not shown), or collected and treated further. For example, the carbon dioxide can be liquefied and recycled.

Sweetened gas produced by the membrane separator 20 exits the separator through a conduit 80 and is conducted to a heat exchanger 82. The heat exchanger 82, or chiller, cools the treated gas to a pipeline-acceptable or marketable temperature range, usually about 65-70 degrees Fahrenheit. The chilled gas is directed to the sales connection through the conduit 84, which connects to the conduit 80 by means of a four-way valve 86. An adjustable choke valve 88 may be included in the sales conduit 84 to maintain the pressure of the treated gas directed to the sales pipeline at a marketable level. A gas analyzer 90 of any suitable type may be included in the sales line. Preferably, the gas analyzer will provide BTU reading.

The preferred heat exchanger 82 is electrically operated. To provide power to the heat exchanger 82, the system 10 preferably includes its own generator 92, which may be mounted on the trailer 18. The generator is electrically connected to the heat exchanger 82 by a suitable connector (not shown). The generator, then, preferably is powered by natural gas. Initially, dirty gas from the production unit 28 is used to fuel the generator 92 through the conduit 94. Once the system begins producing clean or "sweetened: (post-treatment) gas from the membrane separator 20, the sweetened gas is used to fuel the generator 92 through the conduit 96. Sweetened gas may also be circulated through the conduit 96 to fuel the heater 50. An isolation valve 98 may be included in the conduit 96.

In the preferred design of the system 10, the valves are operated hydraulically. Thus, the system 10 preferably includes its own hydraulic plant mounted on the trailer 18 to supply hydraulic power to the system. The hydraulic plant 100 is electrically connected to the generator 92 by conductors not shown, and is fluidly connected to the various valves and other components by conduits, not shown.

Controls for the various components in the system conveniently may be enclosed in a control room 102. Preferably, the control room 102 is enclosed. If space permits, a storage area 104 may also be provided on the trailer 18.

Returning to FIG. 1, where a pipeline is not available, the treated or "clean" gas can be liquefied and placed in containers. To that end, the system 10 may further include a liquification unit 106. This unit will remove any remaining water in the clean gas and convert it to a liquid phase. The liquid gas can then be placed in containers 108 that can be stored on site until a pipeline becomes available, at which time the liquefied natural gas can be restored to a gaseous state and sold. Alternately, the storage containers 108 can be transported for sale or use elsewhere.

In accordance with the method of the present invention, a first gas well is selected. The selected gas well preferably will have recently undergone a stimulation treatment and will be producing dirty gas. Following the stimulation procedure, the dirty natural gas from the first gas well is conducted to a mobile gas separation system at the well site. Preferably, the mobile gas separation system is similar to the system described above. Next, the dirty gas is processed in the gas separation system to produce marketable gas for subsequent sale to a pipeline company.

In the preferred practice of this method, the pre-processed dirty gas coming from the well is intermittently tested to determine its marketability. This testing is carried out with conventional equipment according to known procedures and is not described in detail herein. Once the pre-processed gas is determined to be marketable, then the processing of the gas is terminated. The mobile system now can be removed from the first well site and transported to a second gas well in need of temporary gas processing in accordance with the method of this invention.

Various additional features will suggest themselves to those skilled in this field. For example, a low pressure alarm would be advantageous as it would alert the operator of the system to a leak or other problems that require operator intervention.

Changes can be made in the combination and arrangement of the various parts and elements described herein without departing from the spirit and scope of the invention as defined in the following claims.

What is claimed is:

1. A mobile gas separator system for temporary use at the well site of a natural gas well following stimulation that produces dirty gas, the system comprising:
    a trailer adapted to be parked temporarily at the well site;
    a gas separator mounted on the trailer and adapted to remove selected contaminants from dirty natural gas to produce marketable gas;
    a pretreatment assembly mounted on the trailer, the pretreatment assembly being adapted to receive dirty gas from the gas well, to prepare the dirty gas for the gas separator, and to conduct the prepared dirty gas to the gas separator.

2. A method for processing dirty natural gas to produce marketable gas, the method comprising:
    conducting dirty natural gas from a first gas well following stimulation to a mobile gas separation system at the well site of the first gas well;
    processing the dirty gas in the gas separation system to produce marketable gas, wherein the processing comprises removing carbon dioxide from the dirty gas; and
    liquefying the carbon dioxide.

3. The system of claim 1 wherein the pretreatment assembly comprises a first separator adapted to remove selected contaminants from the dirty gas.

4. The system of claim 3 wherein the first separator comprises a sand separator adapted to remove particulate matter from the dirty gas.

5. The system of claim 1 wherein the pretreatment assembly comprises a second separator adapted to remove small oil and water aerosols.

6. The system of claim 5 wherein the second separator comprises a coalescing filter.

7. The system of claim 1 wherein the pretreatment assembly comprises a heater adapted to adjust the temperature of the pretreatment dirty gas to a temperature suitable for the gas separator.

8. The system of claim 7 wherein the pretreatment assembly comprises a recirculating assembly to recirculate gas through the heater until the gas reaches a desired temperature.

9. The system of claim 8 wherein the recirculating assembly comprises a recirculating valve and a temperature sensor.

10. The system of claim 1 wherein the pretreatment assembly comprises a guard vessel adapted to remove oil and glycol vapors.

11. The system of claim 10 wherein the guard vessel comprises an activated carbon adsorbent.

12. The system of claim 10 wherein the pretreatment assembly comprises a polishing filter downstream of the guard vessel adapted to remove additional aerosols and particulate matter from the dirty pretreatment gas.

13. The system of claim 1 further comprising a hydraulic plant mounted on the trailer to supply hydraulic power to the pretreatment assembly.

14. The system of claim 13 further comprising a generator mounted on the trailer and adapted to power the hydraulic plant.

15. The system of claim 1 wherein the trailer is removably connected to a vehicle for transporting the system.

16. The system of claim 1 wherein the gas separator is a membrane separator.

17. The system of claim 16 wherein the membrane separator adapted to selectively reduce carbon dioxide, hydrogen sulfide and water content in the dirty gas.

18. The system of claim 17 wherein the membrane separator comprises cellulose acetate polymer membrane modules.

19. The system of claim 1 further comprising:
    a heater adapted to adjust the temperature of the pretreatment dirty gas to a temperature suitable for the gas separator;
    a hydraulic plant mounted on the mobile support to supply hydraulic power to the pretreatment assembly;
    a generator mounted on the mobile support and adapted to power the hydraulic plant;
    means to circulate dirty pretreatment gas to fuel the heater;
    means to circulate post-treatment gas to fuel the heater;
    means to recirculate pretreatment gas through the heater until the pretreatment gas reaches a desired temperature; and
    means to selectively control the source of the gas used to drive the heater.

20. The system of claim 19 wherein the means to circulate dirty pretreatment gas and the means to circulate post-treatment gas comprise electro-hydraulically controlled valves.

21. The system of claim 1 further comprising a heat exchanger mounted on the trailer and adapted to adjust the temperature of the post-treatment gas received from the gas separator to a marketable temperature.

22. The system of claim 1 further comprising means for maintaining the pressure of the post-treatment gas at a marketable level.

23. The system of claim 22 wherein the means for maintaining the pressure of the post-treatment gas at a marketable level is an adjustable choke.

24. The system of claim 1 further comprising a liquification unit adapted to receive the marketable gas and convert it to a liquid phase.

25. The system of claim 24 further comprising containers adapted to receive the liquefied marketable gas.

26. The method of claim 2 further comprising:
during the processing step, testing the pre-processed dirty gas to determine marketability; and
terminating the processing step in response to a determination that the pre-processed dirty gas has become marketable.

27. The method of claim 2 further comprising recycling the liquefied carbon dioxide.

28. The method of claim 2 wherein the removal of carbon dioxide is carried out using a gas separator.

29. The method of claim 28 wherein the gas separator is a membrane separator.

30. The method of claim 29 wherein the processing step comprises pretreating the gas prior to removing the carbon dioxide for the removal of particulate matter, free water, aerosols, condensates, oil and glycol vapors.

31. The method of claim 30 wherein the processing step comprises adjusting the temperature of treated gas to a marketable temperature.

32. The method of claim 26 further comprising, after terminating the processing step, removing the gas separation system from the first well site.

33. The method of claim 2 further comprising:
during the processing step, testing the pre-processed dirty gas to determine marketability;
terminating the processing step in response to a determination that the pre-processed dirty gas has become marketable;
after terminating the processing step, removing the gas separation system from the first well site;
after removing the gas separation system from the first well site, moving the gas separation system to the well site of a second gas well, conducting dirty natural gas from the second gas well following stimulation to the mobile gas separation system at the well site of the second gas well; and
processing the dirty gas in the gas separation system to produce marketable gas.

34. The method of claim 2 comprising liquefying the marketable gas produced by the processing step.

35. The method of claim 34 comprising placing the liquefied marketable gas in containers at the well site.

\* \* \* \* \*